United States Patent [19]
Rich et al.

[11] Patent Number: 4,945,148

[45] Date of Patent: Jul. 31, 1990

[54] SILICONE-POLYCARBONATE BLOCK COPOLYMERS

[75] Inventors: Jonathan D. Rich, Rexford; Philip J. McDermott, Clifton Park; Gary C. Davis, Albany; Peter P. Policastro, Niskayuna; Karen A. Regh, Clifton Park, all of N.Y.; Pamela K. Hernandez, North Olmsted, Ohio; Thomas L. Guggenheim, Scotia, N.Y.

[73] Assignee: General Electric Company, Schenectady, N.Y.

[21] Appl. No.: 319,025

[22] Filed: Mar. 6, 1989

[51] Int. Cl.$^5$ .............................................. C08G 77/04
[52] U.S. Cl. ........................................ 528/26; 528/25; 528/29
[58] Field of Search ............................. 528/25, 26, 29

[56] References Cited

PUBLICATIONS

Harold Rosenberg, et al.; Siloxane-Modified Polyarylene Carbonates, (Modification of Polymers) pp. 457–468, 1979.

Chemical Abstracts, pp. 1903–1904, vol. 63, 1965.

Howard A. Vaughn, Polymer Letters, pp. 569–572, vol. 7, 1969.

Will D. Merritt, Jr., Organopolysiloxane–Polycarbonate Block Copolymers Ref. #136962, 152338 and 153605, Chemical Abstracts, vol. 81, 1974.

*Primary Examiner*—Melvyn I. Marquis
*Attorney, Agent, or Firm*—William A. Teoli; James C. Davis, Jr.; William H. Pittman

[57] ABSTRACT

Silicone-polycarbonate block copolymers are provided resulting from the reaction of certain siloxy aromatic imide siloxanes or hydroxyaromatic ester siloxanes which are made by effecting reaction between an organosiloxane having terminal aromatic anhydride groups or aromatic haloacyl groups which are each attached to silicon by silicon arylene linkages with an appropriate bishydroxyarylene compounds or hydroxyarylene amino compound. The aforementioned hydroxyaromatic imide siloxanes or hydroxyaromatic ester siloxanes are then phosgenated with a dihydric phenol or an aromatic bischloroformate. The silicone-polycarbonate block copolymers have been found to be flame retardant and useful as dielectric films and membranes, and as flame retardants in aromatic polycarbonates.

5 Claims, No Drawings

SILICONE-POLYCARBONATE BLOCK COPOLYMERS

CROSS REFERENCE TO COPENDING APPLICATIONS

1. Reference is made to copending application Ser. No. 07/319,026, filed Mar. 6, 1989, now U.S. Pat. No. 4,916,194 for Flame Retardant Aromatic Polycarbonate filed concurrently herewith and assigned to the same assignee as the present invention.

BACKGROUND OF THE INVENTION

The present invention relates to flame retardant organopolysiloxane-polycarbonate block copolymers having nuclear bound silicon atoms attached to certain aromatic imide or aromatic ester groups by carbon-silicon bonds.

Prior to the present invention, silicone-polycarbonate block copolymers, such as shown by Vaughn, U.S. Pat. No. 3,189,662, were made by initially forming a polydimethylsiloxane having terminal bisphenol groups. A silicone-polycarbonate block copolymer was produced by phosgenating a mixture of the bisphenol-terminated polydiorganosiloxane and additional bisphenol. Although the resulting silicone polycarbonate block copolymer was found to possess valuable film forming properties useful in a variety of applications, the silicon-oxygen arylene linkage between the silicone blocks and the polycarbonate block was often hydrolytically unstable in particular situations. Improved hydrolytic stability was achieved by phosgenating polydiorganosiloxane having terminal Si-C bonded propylphenylhydroxy groups with bisphenol, as shown by Vaughn, U.S. Pat. No. 3,419,634. Although the hydrolytic stability of the resulting silicone polycarbonate block copolymers was improved as a result of a silicon atom being directly attached to a propyl carbon, the silicon propyl linkage did not offer the degree of thermal oxidative stability as would be provided by a silicon aryl linkage.

The present invention is based on the discovery that hydrolytically stable silicone-polycarbonate block copolymers having nuclear bound silicon atoms attached to arylene radicals by carbon-silicon bonds can be made by phosgenating mixtures of dihydric phenols, as defined hereinafter, with hydroxyarylimide siloxanes having the formula

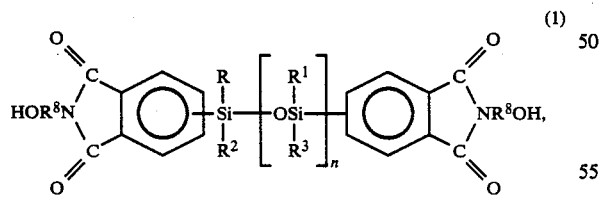

or hydroxyaryl ester siloxanes having the formula

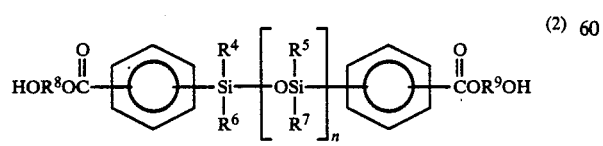

or mixtures of such siloxanes of formulas 1 and 2, where $R$—$R^7$ of formulas (1) and (2) are selected from the same or different $C_{(1-14)}$ hydrocarbon radicals or $C_{(1-14)}$ hydrocarbon radicals substituted with radicals inert during equilibration or condensation, $R^8$ is selected from $C_{(6-13)}$ divalent arylene radicals and $C_{(6-13)}$ divalent arylene radicals substituted with radicals inert during equilibration or condensation and $R^9$ is selected from $C_{(6-20)}$ divalent aromatic hydrocarbon radicals, or $C_{(6-20)}$ divalent aromatic hydrocarbon radicals substituted with radicals inert during equilibration or condensation and n is an integer equal to from 1 to 200 inclusive.

It has been found that silicone-polycarbonate block copolymers can be made by phosgenating mixtures of hydroxyaryl imide siloxanes of formula (1) or hydroxyaryl ester siloxanes of formula (2) or mixtures thereof with one or more $C_{(6-20)}$ aromatic dihydroxy compounds. The silicone block of the resulting silicone-polycarbonate block copolymers is attached to the polycarbonate block by a silicon-arylene linkage. The silicone-polycarbonate block copolymers of the present invention exhibit flame retardant properties, and improved hydrolytic and oxidative stability and enjoy all of the valuable characteristics of the aforementioned silicone-polycarbonate block copolymers of the prior art, such as semi-permeability, injection-moldability and use in forming high performance films and coatings.

STATEMENT OF THE INVENTION

There is provided by the present invention, silicone-polycarbonate block copolymers having 0.5 to 90% by weight of silicone blocks and comprising recurring chemically combined groups of the formula $$-YD-, \qquad (3)$$

where

Y is a divalent organosiloxane group having the formula

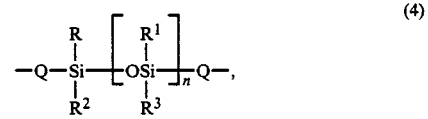

Q is a member selected from the class consisting of

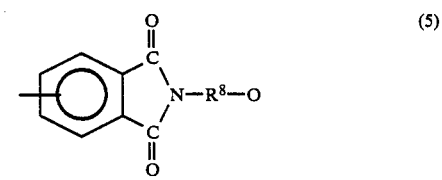

and

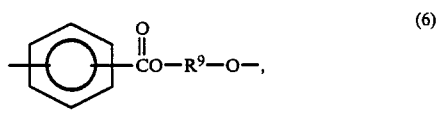

and mixtures thereof,

D is a divalent polycarbonate block having the formula

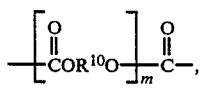

where R—R$^3$, R$^8$ and R$^9$ and n are as previously defined, R$^{10}$ is a divalent C$_{(6-20)}$ aromatic organic radical selected from R$^9$ radicals, and m is an integer equal to from 1 to 99 inclusive.

Radicals included by R—R-$^7$ of formulas (1), (2) and (4) are, for example, C$_{(1-8)}$ alkyl radicals, such as methyl, ethyl, propyl, butyl, pentyl, hexyl and octyl; substituted alkyl, such as trifluoropropyl and cyanoethyl; cycloaliphatic radicals, such as cyclobutyl, cyclopentyl and cyclohexyl; alkenyl radicals, such as vinyl and propenyl; aromatic radicals, such as phenyl, tolyl, xylyl and naphthyl; substituted aryl radicals, such as nitrophenyl, bromotolyl, chlorophenyl and chloronaphthyl.

There are included within R$^8$, R$^9$, and R$^{10}$, divalent arylene radicals, such as phenylene, tolylene, xylylene and naphthylene and such arylene radicals substituted with chloro, nitro and cyano.

The hydroxyarylimide siloxanes of formula (1) can be made by condensing hydroxyaminoaromatic compounds such as aminophenols of the formula

NH$_2$R$^8$OH    (8)

where R$^8$ is as previously defined, with organosiloxanes having terminal aromatic anhydride groups, such as shown by Rich, U.S. Pat. No. 4,794,153 incorporated herein by reference. The hydroxyaryl ester organosiloxane of formula (2) can be made by effecting reaction between a polydiorganosiloxane having terminal haloacylaromatic groups, such as 1, 1, 3, 3-tetramethyl-1,3-disiloxanyl bisbenzoic acid chloride as shown by Rich, U.S. Pat. No. 4,604,477 incorporated herein by reference, and a dihydric phenol. Suitable dihydric phenols are, for example 2,2-bis-(2,-hydroxyphenyl)propane, 2,4'-dihydroxybiphenylmethane, bis-(2-hydroxyphenyl)methane, 2,2-bis-(4-hydroxyphenyl)propane, referred to hereinafter as "bisphenol A" or "BPA", 1,1-bis(4-hydroxyphenyl)ethane, 1,1-bis(4-hydroxyphenyl)propane, 4,4'-dihydroxybiphenyl, 4,4'-dihydroxy-3,3',5,5'-tetramethylbiphenyl, 2,4-dihydroxybenzophenone, 4,4'-dihydroxydiphenylsulfone, 2,4'-dihydroxydiphenylsulfone, 4,4'-dihydroxydiphenyulsulfoxide, 4,4'-dihydroxydiphenylsulfide, tetramethyl bisphenol,1,1,1,1-dichloro-2,2-bis(4-hydroxyp[hpenyl)ethylene, 6,6'-dihydroxy-3,3,3',3'-tetramethyl-bis-1,1'-spirobiindane

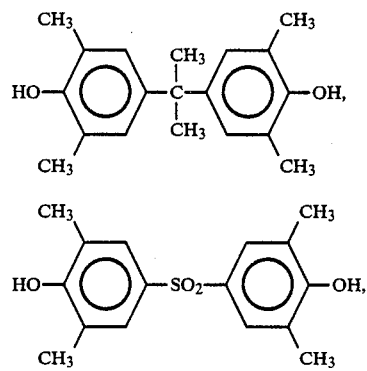

and

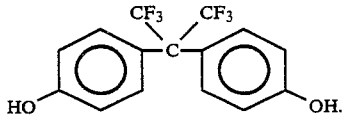

In the practice of the present invention, the hydroxyimide siloxanes of formula (1) can be made by effecting reaction between a hydroxyaminoaromatic compound of formula (8), such as para or meta aminophenol, and an aromatic anhydride-terminated polydiorganosiloxane which can be in the form of a tetraorganodisiloxane or a polydiorganosiloxane having up to 1000 chemically combined diorganosiloxy units. Reaction can be effected with temperatures in the range of from 20 to 200° C. in the presence of an organic solvent under reflux conditions.

The hydroxyaromatic ester siloxanes of formula (2) can be made by effecting reaction between a dihydric phenol such as bisphenol A and a diorganosiloxane having terminal aromatic haloacyl or aromatic carboxy groups of the formula

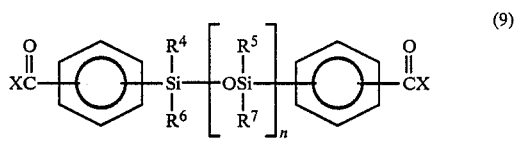

where R$^4$-R$^7$ and n are as previously defined, and X is selected from chloro or hydroxy, in the presence of an acid acceptor, such as triethylamine.

The silicone-polycarbonate block copolymers of the present invention included within formula (3) can be made by phosgenating a mixture of the hydroxyarylimide siloxane of formula (1), or the hydroxyarylester siloxane of formula (2), or mixture thereof, with dihydric phenol, or by using a bishaloformate of the dihydric phenol. The condensation reaction can be run in the presence of an inert organic solvent, such as methylene chloride, in the presence of an acid acceptor such as triethylamine. Recovery of the imide polycarbonate siloxane or ester polycarbonate siloxane can be achieved by precipitating the resulting block copolymer in a solvent such as methanol.

Silicone-polycarbonate block copolymers of the present invention can be blended with inert filler such as silica, glass fiber, or carbon fiber in the proportion of 0.1 to 100 parts of filler, per 100 parts of the block copolymer by weight. The silicone polycarbonate block copolymers of the present invention can be cast from organic solvent solutions to form films useful as dielectrics, insulating coatings on metallic conductors, membranes for dialysis, high performance thermoplastics, etc. They also can be used as flame retardants for aromatic polycarbonates.

In order that those skilled in the art will be better able to practice the present invention, the following examples are given by way of illustration and not by way of limitation. All parts are by weight unless otherwise indicated.

EXAMPLE 1

A mixture of 20 grams (4.7×10$^{-2}$ moles) of bis (1,3-phthalic anhydride) tetramethyldisiloxane (PADS) and 104 grams (0.35 moles) of octamethylcyclotetrasiloxane was placed in 150 ml of dry toluene and heated to 80° C. Trifluoromethanesulfonic anhydride (3 drops) and 5 microliters of water were then added and the solution heated for 2 hours at 80° C. The equilibrated reaction mixture was quenched with anhydrous magnesium oxide (3 grams) and cooled to room temperature. The resulting mixture was then filtered and the toluene removed in vacuo. The remaining liquid was then heated to 110° C. to 0.05 torr to remove unreacted cyclic siloxanes. There was obtained 89 grams (72%) yield) of a clear silicone oil which turned to an opaque, white waxy oil upon cooling. Based on method of preparation, the material was a phthalic anhydride end-capped polydimethylsiloxane fluid having an average of 20 chemically combined dimethylsiloxy units.

Fifty grams ($2.52 \times 10^{-2}$ moles) of the above phthalic anhydride-terminated siloxane fluid and 5.49 grams ($5.04 \times 10^{-2}$ moles) of m-aminophenol were dissolved in 150 ml of o-xylene and heated to reflux. Water was continuously removed with a Dean-Stark trap and after 2 hours reflux the reaction was complete. Based on the method of preparation and infrared data, the isolated product (52 grams, 95% yield) was an imidyl phenol-terminated polydimethyl siloxane fluid having an average of 20 chemically combined dimethylsiloxy units. Its identity was further confirmed by infrared (neat, thin film) 3500–3160 cm$^{-1}$(d,s) OH phenol; 2960 cm$^{-1}$(s) C—H$_3$ 1775(m), 1715(s) carbonyl, phthalimide.

EXAMPLE 2

A mixture of 30.0 grams ($7.04 \times 10^{-2}$ moles) of bis (1,3-phthalic anhydride) tetramethyldisiloxane and 15.4 grams ($1.41 \times 10^{-2}$ moles) of m-aminophenol was dissolved in 150 ml of o-xylene and heated to reflux while continuously removing water with a Dean-Stark trap. After 2 hours the reaction was completed and the o-xylene removed in vacuo. Upon cooling, 39 grams (86% yield) of white solid product was obtained which had a melting point of 196–200° C. after recrystallization from dry toluene. Based on the method of preparation the product obtained was bis(1,3-phthalimidophenol) tetramethyldisiloxane.

EXAMPLE 3

There was added dropwise 4.34 grams ($1.23 \times 10^{-2}$ moles) of bisphenol A bischloroformate dissolved in 20 ml. of dry methylene chloride to a stirred mixture of 1.34 grams ($5.87 \times 10^{-3}$ moles) of bisphenol A, 20.0 grams ($6.4 \times 10^{-2}$ moles) of an imidylphenol polydimethylsiloxane having an average of 34 chemically combined dimethylsiloxy units and 2.48 grams of triethylamine dissolved in 20 ml. of dry methylene chloride. The solution viscosity of the resulting mixture increased upon the complete addition of the bisphenol A bischloroformate solution. There was obtained a product which was twice precipitated from methanol and dried under vacuum at 70° C. for 8 hours. There was obtained a yield of 39.68 grams or 89%. The siloxane content of the resulting product based on $^1$H NMR was found to be 69%. Scanning TGA (N$_2$) indicated a 10% weight loss at 425° C. at a scan rate of 10°/minute. Based on method of preparation and the aforementioned data, the product was a silicone-polycarbonate block copolymer having silicone blocks joined to polycarbonate blocks through silicon phenyl imide phenyl groups. Thin transparent films were cast from the silicone-polycarbonate block copolymer which exhibited visco elastic behavior.

EXAMPLE 4

In accordance with the procedure of Example 3, there was added 10 grams ($3.83 \times 10^{-2}$ moles) of bisphenol A bischloroformate dissolved in 20 ml. of dry dichloromethane to a 100 ml. solution in methylene chloride consisting of 5.65 grams ($2.47 \times 10^{-2}$ moles) of bisphenol A, 6.47 grams ($3.54 \times 10^{-3}$ moles) of an imidylphenol-terminated polydimethylsiloxane fluid having an average of 20 chemically combined dimethylsiloxy units and 5.72 grams ($2.83 \times 10^{-2}$ moles) of dry triethylamine. There was obtained a viscous dichloromethane solution from the resulting stirred mixture. The product was isolated by twice precipitating it in methanol, filtering and drying under vacuum at 80° C. for 15 hours. There was obtained 17.6 grams (87%) of product. Based on method of preparation and GPC, the product had a weight average molecular weight of 185,000 and a dispersivity of 6. The product was a silicone polycarbonate which had a weight percent silicone of about 27% as determined by $^1$H NMR. The silicone block copolymer was a tough, flexible transparent thermoplastic.

EXAMPLE 5

A solution of 10.96 grams ($3.1 \times 10^{-2}$ moles) of bisphenol A bischloroformate in 25 ml. of dry methylene chloride was added dropwise to a solution of 20.0 grams (3.1 x 10-2 moles) of a bisimidylphenol tetramethyldisiloxane, 6.27 grams ($6.2 \times 10^{-2}$ moles) of triethylamine and 100 ml. of dry methylene chloride. An increase in the solution viscosity of the resulting mixture resulted upon complete addition of the bisphenol A bischloroformate solution. A product was obtained which was twice precipitated from methanol and dried in a vacuum oven at 70° C. for 8 hours. GPC analysis showed an $M_n$ of 15,900 with the dispersivity being 1.68. There was obtained a yield of 25.4 grams or 88%. Based on method of preparation, the product was a silicone-polycarbonate block copolymer consisting essentially of chemically combined 1,3-bis(meta-imidylphenol)tetramethyldisiloxane blocks and bisphenol A polycarbonate blocks.

EXAMPLE 6

There was added 2.06 grams (0.010 mole) of 1,3-bis-benzoylchloride(tetramethyldisloxane) in 10 ml. of methylene chloride to a stirred solution of 22.83 grams (0.10 mole) of bisphenol A, 125 ml. of methylene chloride, 100 ml. of water and 0.30 ml. of triethylamine. After the addition, 0.5 gram of p-cumylphenol was added and the vigorously stirred mixture was phosgenated with 11.5 grams (0.12 mole) of phosgene while maintaining the pH of the resulting mixture at 9–11 over a 21 minute period. The methylene chloride layer was extracted three times with 3N hydrochloric acid and four times with deionized water. The mixture was then added to methanol to effect a precipitation of product. Based on method of preparation, the product was a polyestercarbonate siloxane copolymer having chemically combined groups within the scope of formula (4) where Q is in the scope of formula (6). It had an $M_n$ of 13,500 g/mole. The copolymer was compression molded to 1/16″ bars and tested for flame retardance. It was found that the bars provided a V-0 rating upon UL94 testing.

EXAMPLE 7

There was added 2.37 grams (0.01 mole) of parachlorodimethylsilylbenzoyl chloride to a stirred suspension of 0.09 grams of water (0.005 mole) in 120 ml. of methylene chloride containing 0.75 grams of triethylamine. After a couple of minutes, 22.83 grams (0.10 mole) of bisphenol A was added to the resulting mixture along with 0.3 gram of paracumylphenol in 100 ml. of water. There was then added 11.5 grams (0.12 mole) of phosgene to the resulting mixture over a period of 20 minutes while the pH was maintained between 9 and 11. The product was recovered as shown in Example 6. The resulting product was a copolymer based on method of preparation having an $M_n$ of 18,700 g/mole. The copolymer was compression molded to 1/16" bars which provided a V-O rating in UL94 burn test.

EXAMPLE 8

There was added 1.0 gram (0.0042 mole) of parachlorodimethylsilylbenzoyl chloride to a solution of 6.4 grams of a polydimethylsilanol terminated fluid having an average of 11 chemically combined dimethylsiloxy units and 120 ml. of methylene chloride containing 0.4 gram of triethylamine. There was added to the resulting mixture 22.83 grams (0.10 mole) of bisphenol A and 100 ml. of water. The resulting mixture was phosgenated with stirring with 11 grams (0.11 mole) of phosgene over a 20 minute period. The product was precipitated in accordance with the procedure of Example 7. Based on method of preparation, the product was a polyestercarbonate siloxane block copolymer having an $M_n$ of 17,900 g/mole with an average siloxane repeat unit of about 11.

EXAMPLE 9

There was added to a stirred solution of 2 grams of a polyestercarbonate siloxane copolymer prepared as in Example 7 with an $M_n$ of 14,200 g/mole dissolved in 6 ml. of dry methylene chloride, a solution of 1.36 ml. of octamethylcyclotetrasiloxane, 20 microliters of methanesulfonic acid and 2 ml. of methylene chloride. After 22 hours, the solution was treated with magnesium oxide, after 30 minutes was filtered, precipitated in methanol and dried. Based on method of preparation, there was obtained an equilibrated polyestercarbonate siloxane copolymer having an $M_n$ of 12,300 g/mole and an average siloxane repeat unit of about 5.

A 5% solution of the above copolymer in methylene chloride is cast upon a glass substrate. Upon evaporation of the solvent, there was obtained a polyestercarbonate siloxane copolymer film useful as a membrane.

Although the above examples are directed to only a few of the very many variables which can be used in the practice of the method of the present invention to prepare the silicone-polycarbonate block copolymers, it should be understood that the present invention is directed to a much broader variety of silicone-polycarbonate block copolymers which can be made by effecting reaction between a hydroxyimide-terminated siloxane as shown by formula (1) or a hydroxyester-terminated siloxane as shown by formula (2) with dihydric phenol with dihydroxy bishaloformate or phosgene along with a chainstopper in particular situations.

What is claimed is:

1. A silicone-polycarbonate block copolymer having 0.5 to 90% by weight of silicone blocks and comprising recurring chemically combined groups having the formula $$-YD-,$$

where
Y is a divalent organosilicon siloxane group having the formula

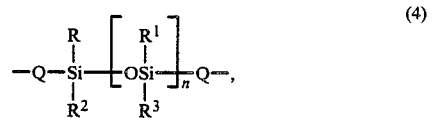

Q is a member selected from the class consisting of

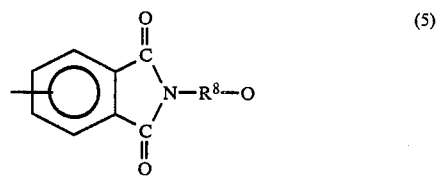

and

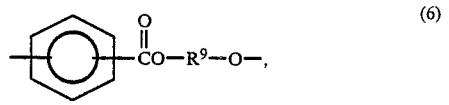

and mixtures thereof,
D is a divalent polycarbonate block having the formula

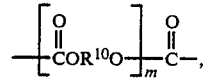

where $R-R^3$ are selected from the same or different $C_{(1-14)}$ hydrocarbon radicals or $C_{(1-14)}$ hydrocarbon radicals substituted with radicals inert during equilibration or condensation, $R^8$ is selected from divalent $C_{(6-13)}$ divalent arylene radicals $OCC_{(6-13)}$ divalent arylene radicals substituted with radicals inert during equilibration or condensation, $R^9$ and $R^{10}$ are selected from $C_{(6-20)}$ divalent aromatic hydrocarbon radicals, or $C_{(6-20)}$ divalent aromatic hydrocarbon radicals substituted with radicals inert during equilibration and condensation, n is an integer equal to from 1 to 200 inclusive and m is an integer equal to from 1 to 50 inclusive.

2. A silicone-polycarbonate block copolymer in accordance with claim 1, where Q is

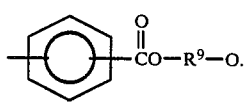

3. A silicone-polycarbonate block copolymer in accordance with claim 1, where Q is

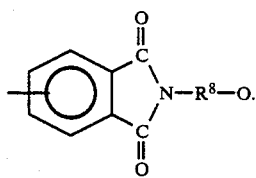
4. A silicone-polycarbonate block copolymer in accordance with claim 1, where $R^1$–$R^3$ are selected from the same or different $C_{(1-8)}$ alkyl radicals.
5. A silicone-polycarbonate block copolymer in accordance with claim 1 having bisphenol A polycarbonate blocks.
* * * * *